June 10, 1924.  1,497,362
P. F. DHÉ
PROCESS FOR THE DESICCATION OF WOOD
Filed Oct. 29, 1923
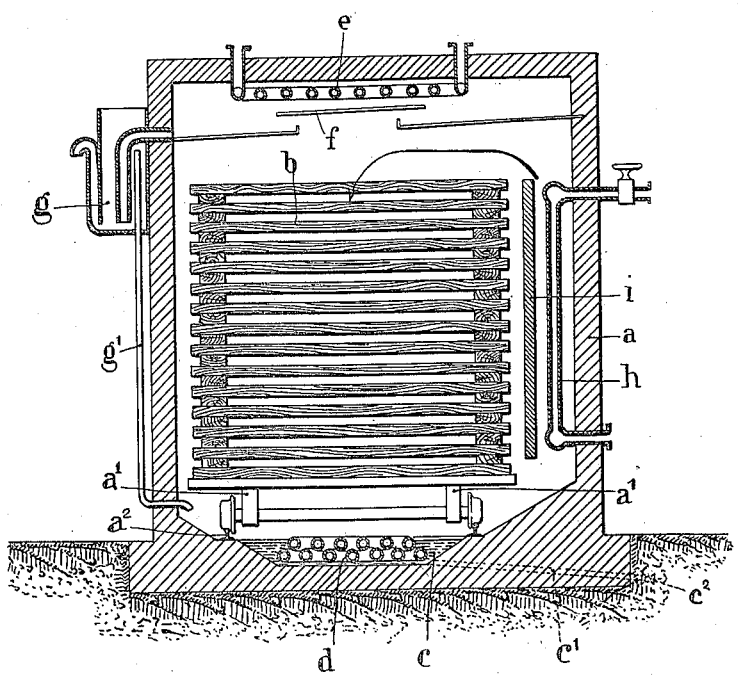
Inventor
P. F. Dhé
by Langner, Parry, Card & Langner
Attys Patented June 10, 1924.

1,497,362

UNITED STATES PATENT OFFICE.

PAUL FRANÇOIS DHÉ, OF PARIS, FRANCE, ASSIGNOR TO CHARLES LOUIS MAURER, OF PARIS, FRANCE.

PROCESS FOR THE DESICCATION OF WOOD.

Application filed October 29, 1923. Serial No. 671,599.

*To all whom it may concern:*

Be it known that I, PAUL FRANÇOIS DHÉ, citizen of the French Republic, residing at Paris, France, have invented certain new and useful Improvements in Processes for the Desiccation of Wood, of which the following is a specification.

In processes actually in use for drying wood, it is necessary to considerably delay the drying either by using low temperatures or by causing an excess of humidity in the surrounding air or by any other method of reducing the speed of superficial evaporation during the entire duration of the treatment. It is necessary to proceed in this manner in order to prevent excessive rapidity in drying the surface which alone is exposed to the direct action of the heating agent. It is in fact necessary to avoid during the drying a superficial hardening, the formation of external or internal cracks, the tendency to warp or bend, and so forth; all these defects are produced by the differences, in the procedure of drying, between the external and internal layers, and are due to the hygroscopic properties of green wood. The general slowing down of the drying, imposed by these technical reasons, considerably increases the importance of the constructions necessary for this operation and the cost of production thereof.

It has also been proposed to dry wood by subjecting it to the action of vapours of volatile liquids, which are nonmiscible with water, such as benzol, benzene, etc. These vapours carry along the steam, which is formed in wood by the freeing, due to the contact with wood, of the heat of evaporation stored in the liquid. The mixture of steam and of vapours of the volatile liquid is brought into contact with a cooler, so that both water and volatile liquid condense and may be separated and collected.

This action of the vapours of volatile liquids is chiefly a physical action, slightly assisted by a chemical one, slightly poisonous. This process meets in the industrial applications with great difficulties. It is very difficult to obtain economically large rooms, which are both fluid-tight and unattacked by the vapours of said volatile liquids.

All of said liquids, except carbon tetrachloride, are very inflammable and the atmosphere of the drying room is very explosive at the discharging point; they also are more or less poisonous.

My improved process is based on the following fact. I have discovered that the difficulty met in drying wood is due to the fact that the sap impregnating the wood is not at all water in the free state, but on the contrary an organic liquid of complex composition and having the special feature of being colloidal and living.

The felled wood possesses, during several months after it has been felled, a cellular life in the latent state. Sap extracted from green wood has the form of a partially colloidal liquid and has therefor the property common to many natural colloids, of a great resistance to drying.

I have ascertained that the said colloidal nature of sap depends, if not wholly, at any rate partially, on the latent life of the ferments contained in the sap and rapidly diminishes when the cellular life has been destroyed.

On the other hand, the operation of coagulating the sap, i. e., of artificially destroying its colloidal nature, has for result the separation of water in the free state, the evaporation of which is then much more rapid.

My improved process for drying wood is based on said observations and essentially consists in destroying the latent cellular life of the green wood and in partially coagulating the proteins of the sap, by subjecting the felled wood to the simultaneous action of a moderate heat and of acetic acid vapours. By means of such a preliminary treatment, of short duration, the water contained in the green wood evaporates and leaves the wood under external influences notably less than that required for drying green wood which has not been subjected to such a preliminary treatment. The said vapours of acetic acid do not take part in the evaporation of the water contained in the wood, but act merely to prepare the wood to allow the same of quickly yielding, afterwards, a water which is no more a colloidal solution.

In order to avoid a premature evaporation of water during the preliminary treatment of wood by the acetic acid vapours, the atmosphere of the room is preferably saturated with steam which assists in heating the wood.

The subsequent desiccation of wood is effected, as desired, in the open air or in a current of heated air.

The vapours of acetic acid exert no physical action, but merely a chemical one:

(a) They destroy the ferments contained in the sap and the latent cellular life of green wood;

(b) They coagulate the vegetable proteins and destroy the colloidal state of the sap, and set free the water contained therein (this action is similar to that of the acids upon milk, blood, etc.).

(c) They quickly enter into the wood cells.

The intensity of these various actions is such that acetic acid may be used in very small amount, about 1/300 of the weight of wood. Moreover, acetic acid being a cheap substance, it is not necessary to recover it at the end of the operation.

The annexed drawing shows, by way of example, in sectional elevation, an apparatus for the treatment of wood by the process according to my invention.

In the fluid tight chamber $a$ is suitably stacked, on a truck $a^1$ running on rails $a^2$, the green wood to be treated, $b$; in the bottom of the chamber is provided a trench $c$, containing water acidulated with raw acetic acid (1/10); in said trench is arranged a nest of tubes $d$, through which may be passed, as required, steam from a boiler (not shown). The trench $c$ communicates with the exterior by means of a pipe $c^1$, provided with a tap $c^2$. The circulation of steam through the nest of tubes $d$ causes the water and the acetic acid to boil, and vapours of acetic acid and steam are generated; the acetic acid vapours destroy the cellular life of the stacked wood and coagulate the sap.

A steam radiator $h$, placed at the side of the stack of wood $b$ and separated therefrom by a partition $i$, furnishes the required moderate heat, and a circulation is produced within the chamber $a$ by means of the partition $i$.

At the top of the chamber $a$ is located a nest of tubes $e$, through which cold water is passed at the end of the operation with a view of condensing the excess of steam, due to the action of the radiator $h$ and of the nest of tubes $d$, after lowering of the level of liquid in the trench $c$. The water, condensed by the upper nest of tubes $e$, is collected by the baffle or staggered partitions $f$ and flows into a vessel, $g$, outside of the chamber $a$, and returns, through the pipe $g^1$, into the trench $c$. Said water is thus used again for diluting fresh acetic acid poured into the trench $c$ for the following operation, any acetic acid carried along by water is thus recovered.

What I claim is:

A process for the desiccation of wood, consisting in subjecting green wood to the simultaneous action of a moderate heat and of acetic acid vapours, adapted to destroy the latent cellular life of wood and to coagulate the sap, before drying the wood, still impregnated with water, in any known manner.

In testimony whereof I have signed my name to this specification.

PAUL FRANÇOIS DHÉ.

Witnesses:
S. ARMENGAUDAINI,
M. DEFÈVRIMONT.